United States Patent
Fonseca et al.

(10) Patent No.: US 7,226,973 B2
(45) Date of Patent: Jun. 5, 2007

(54) POLYCARBONATE POLYESTER MOLDING COMPOSITION

(75) Inventors: Rodney W. Fonseca, Newburgh, IN (US); Peter H. Th. Vollenberg, Evansville, IN (US); Richard C. Cook, Evansville, IN (US)

(73) Assignee: General Electric Company, Pittsfield, MA (US)

( * ) Notice: Subject to any disclaimer, the term of this patent is extended or adjusted under 35 U.S.C. 154(b) by 156 days.

(21) Appl. No.: 10/982,673

(22) Filed: Nov. 5, 2004

(65) Prior Publication Data

US 2005/0143532 A1    Jun. 30, 2005

Related U.S. Application Data

(60) Provisional application No. 60/533,610, filed on Dec. 31, 2003.

(51) Int. Cl.
*C08L 69/00*    (2006.01)
*C08L 67/02*    (2006.01)

(52) U.S. Cl. .................. 525/133; 525/148; 525/439

(58) Field of Classification Search ................ None
See application file for complete search history.

(56) References Cited

U.S. PATENT DOCUMENTS 3,635,895 A    1/1972    Kramer
4,001,184 A    1/1977    Scott
4,188,314 A    2/1980    Fox et al.
4,204,047 A    5/1980    Margotte et al.
4,786,692 A    11/1988    Allen et al.
4,879,355 A    11/1989    Light et al.
5,017,659 A    5/1991    van der Groep
5,194,523 A    3/1993    Small, Jr. et al.
5,399,661 A    3/1995    Borman
5,486,562 A    1/1996    Borman et al.
5,942,585 A    8/1999    Scott et al.
6,005,059 A    12/1999    Scott et al.
6,011,124 A    1/2000    Scott et al.
6,037,424 A    3/2000    Scott et al.
6,043,322 A    3/2000    Scott et al.
2004/0138388 A1 *    7/2004    Pecorini et al. ............. 525/439

FOREIGN PATENT DOCUMENTS

GB    1559230 A    1/1980
WO    WO 03/004561    1/2003
WO    WO 03/066704    8/2003

OTHER PUBLICATIONS

Plastics Tech Center data sheet for Makrolon 1239.*

* cited by examiner

*Primary Examiner*—David J. Buttner

(57) ABSTRACT

A thermoplastic blend suitable for blow molding comprising a branched polycarbonate and a polyester resin derived from the condensation of a) a cyclohexanedimethanol or equivalent thereof alone or with an ethylene glycol or equivalent thereof, b) together with a terephthalic acid or equivalents thereof alone or with an isophthalic acid or equivalent thereof.

21 Claims, 1 Drawing Sheet

US 7,226,973 B2

POLYCARBONATE POLYESTER MOLDING COMPOSITION

CROSS REFERENCE TO RELATED APPLICATIONS

This application claims priority to U.S. Provisional Application Ser. No. 60/533,610 filed on Dec. 31, 2003, which is incorporated herein by reference in its entirety.

FIELD OF THE INVENTION

This invention relates to blow moldable blends of polycarbonate and polyester resins with high chemical resistance.

BACKGROUND OF THE INVENTION

U.S. Pat. No. 5,942,585 to Scott et al relates to clear blends of polycarbonates and polyesters where the polyester comprises a dicarboxylic acid component based on 1,4-cyclohexanedicarboxylic acid units and a glycol component comprising 2,2,4,4-tetramethyl-1,3-cyclobutanediol units. Miscible polycarbonate polyester blends are described in a Free Volume approach to the Mechanical Behaviour of Miscible Polycarbonate Blends, by A. J. Hill et al, J. Phys. Condens. Matter, 8, 3811-3827 (1996) and in Dynamic Mechanical and Dielectric Relaxation Study of Aliphatic Polyester Based Blends by Stack et al., J. M. Polym. Mater. Sci. Eng. (1993), 69, 4-5, Eastman Chemical Company, Kingsport, Tenn. 37662. U.S. Pat. No. 4,879,355 to Light et al relates to a clear polymer blend comprising a glycol copolyester having repeat units from 1,4-cyclohexanedimethanol, terephthalic acid and an alkylene glycol; a polycarbonate resin; and an aromatic polyester having repeat units from terephthalic acid, isophthalic acid and Bisphenol A. U.S. Pat. No. 4,786,692 to Allen et al. relates to a blend of an aromatic polycarbonate and a copolymer derived from a glycol portion comprising 1,4-cyclohexanedimethanol and ethylene glycol. Some of these references describe clear properties of the thermoplastic blends.

U.S. Pat. No. 5,399,661 to Borman et al relates to copolyester compositions which comprise the reaction product of at least one straight chain, branched, or cycloaliphatic C2-C10 alkane diol or a chemical equivalent and a mixture of at least two cycloaliphatic diacids. The diacid mixture comprises predominantly a trans isomer and at least one aromatic diacid. As set forth in column 5, lines 41 to 45, "The reaction is generally run with an excess of the diol component and in the presence of a suitable catalyst". U.S. Pat. No. 5,486,562 to Borman et al additionally describes an impact strength modifier for compositions of the type set forth in the '661 patent.

U.S. Pat. No. 4,188,314 to Fox describes the addition of a polyester polymer derived from a cyclohexanedimethanol and a mixture of iso- and terephthalic acid to an aromatic carbonate polymer to enhance the solvent resistance as compared to a polycarbonate article.

Other references include U.S. Pat. Nos. 4,879,355; 6,043,322; 6,037,424; 6,011,124; 6,005,059; 5,942,585; 5,194,523; and 5,017,659 and GB 1,559,230A.

Transparent blends of polycarbonate and polyesters may have attractive properties like toughness and chemical resistance. It is desirable to obtain improved properties for blow molding and good chemical resistance without deleteriously affecting other desirable properties.

SUMMARY OF THE INVENTION

According to an embodiment, a thermoplastic blend suitable for blow molding includes a branched polycarbonate and a resin derived from the condensation of a cyclohexanedimethanol or equivalent thereof alone or with an ethylene glycol or equivalent thereof together with a terephthalic acid or equivalents thereof or a mixture of terephthalic and isophthalic acid or equivalents thereof.

According to an embodiment, a thermoplastic blend includes a from about 25 to about 90 percent by weight of low flow polycarbonate resin comprising a branched polycarbonate having a MFR (Melt Flow Rate; 300 C, 1.2 Kg, 6 min dwell) of from about 1 to about 4 g/10 min ASTM D 1238 and from about 10 to about 75 percent by weight of a polyester resin derived from the condensation of a cyclohexanedimethanol or equivalent thereof alone or with an ethylene glycol or equivalent thereof together with a terephthalic acid or equivalents thereof alone or in combination with an isophthalic acid or equivalents thereof. The two resins are present in proportions to form a clear blend having a transmission of seventy percent or greater using ASTM D1003. The clarity is measured on the polymer blend prior to the addition of an additive such as mica, pigments, glass, stabilizers or another and the like which would affect the light transmission of the blend. Desirable enhanced chemical resistance is provided to the polycarbonate/polyester blend by the addition of a chemical resistance enhancing effective amount of up to about 1.0 weight %, preferably about 0.5 weight % of styrene-acrylic copolymer with multiple epoxy groups. Such a copolymer can also have general beneficial effects such as enhanced hydrostability at a minimum value of at least about 0.05 weight %. A maximum of about 1.0 weight % or less such as about 0.5 weight % depending upon the overall effect of the copolymer on the blend can be employed.

According to an embodiment, the blend consists essentially of the two components with the polycarbonate present in an amount from about 50 to about 80 percent by weight based on the total weight of the blend components. Preferably, the polyester component is present in an amount of about 20 to about 50 weight percent based on the total weight. More preferably the polycarbonate is about 56 to about 80 weight % and the polyester is about 20 to 44 weight %.

According to an embodiment, desirable enhanced chemical resistance is provided with the addition of polycarbonate having a MFR (Melt Flow Rate; at 300 C, 1.2 Kg, 6 min) of about 1 to about 2 g/10 min. Enhanced chemical resistance to detergents such as carpet cleaners and other oily materials is observed. According to an embodiment, the MFR (Melt Flow Rate; at 300 C, for 1.2 Kg, 6 min) for the branched polycarbonate is about 1.3 to about 1.7, or about 2.

DETAILED DESCRIPTION OF THE INVENTION

Figure 1:
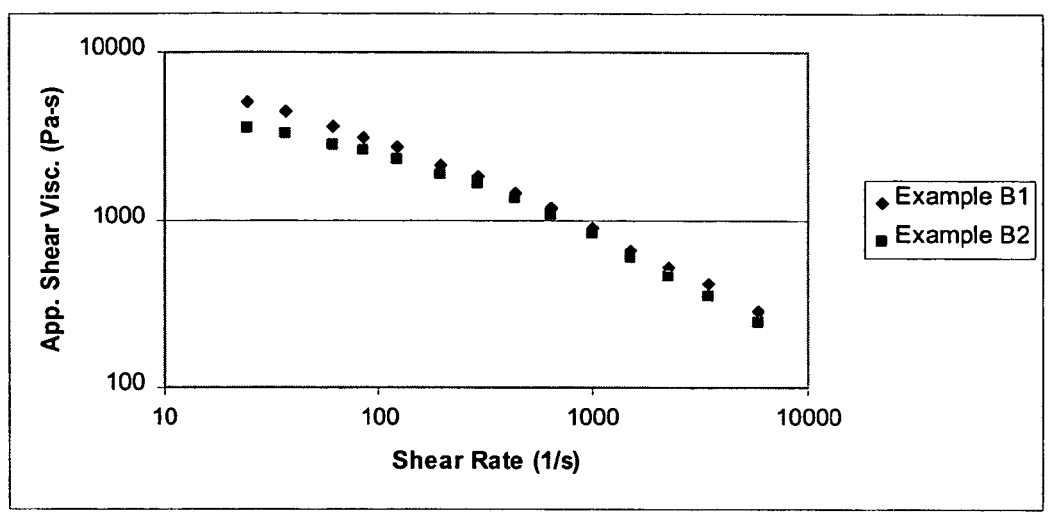
FIG. 1 is a graphical representation of Viscosity vs. Shear Rate for Examples B1 and B2.

The polyester resins are typically obtained through the condensation or ester interchange polymerization of the diol or diol equivalent component with the diacid or diacid chemical equivalent component according to methods known in the prior art. The polycarbonate resin components are prepared according to prior art techniques as referred to herein. Branched polycarbonates are prepared by adding a branching agent during polymerization. These branching agents are well known and may comprise polyfunctional organic compounds containing at least three functional groups which may be hydroxyl, carboxyl, carboxylic anhydride, haloformyl and mixtures thereof. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene),tris-phenol PA (4(4(1,1-bis(p-hydroxyphenyl)-ethyl) alpha, alpha-dimethyl benzyl)phenol), 4-chloroformyl phthalic anhydride, trimesic acid and benzophenone tetracarboxylic acid. The branching agent may be added at a level of about 0.05-2.0 weight percent. Branching agents and procedures for making branched polycarbonates are described in U.S. Letters Pat. Nos. 3,635,895; 4,001,184; and 4,204,047 which are For sake of clarity, the following Table 1 sets forth the meaning of the abbreviations used throughout the specification.

TABLE 1

Abbreviations

| Abbreviation | Name |
| --- | --- |
| PC | Polycarbonate |
| CHDM | 1,4-cyclohexanedimethanol (trans/cis mixture) |
| t-DMCD | dimethyl trans-1,4-cyclohexanedicarboxylate |
| TPA | Terephthalic acid |
| EG | Ethylene glycol |
| PCTG | TPA + CHDM + EG, where CHDM > EG |
| MV | Melt Viscosity |
| $T_m$ | Melting Point |
| IPA | Isophthalic Acid |

It was found that by using a branched PC, the properties desired for chemical resistance are enhanced. These are particularly useful when containers molded from the blend hold highly organic materials such as cleaners, oils and the like. In addition, the low yellowness Index (YI) is a significant and important parameter of the blend.

In an embodiment, the transparent blend includes PC and a polyester containing the condensation product of 1,4-cyclohexanedimentanol, alone, or 1,4-cyclohexanedimentanol with ethylene glycol, with a terephthalic acid, or terephthalic acid and isophthalic acid.

A process for the preparation of a clear molding composition comprises selecting a blend of low flow PC and PCTG within the compositional range of ingredients for imparting clear properties to the resulting blend and wherein said proportions of ingredients are selected so as to impart improved chemical resistant properties.

According to an embodiment, the PCTG/PCTA type cycloaliphatic polyesters are condensation products of aromatic diacids, or chemical equivalents and aliphatic diols, or chemical equivalents. The diol component comprises CHDM alone or with ethylene glycol. Typical diol components for condensation reactions include aliphatic diols, such as alkylene diols containing from 2 to about 10 carbon atoms. The hexacarbocyclic dicarboxylic acids which are condensed with the cyclohexanedimethanol and the alkylene diol, such as ethylene diol, are a terephthalic acid or terephthalic acid and an isophthalic acid.

Additional typical polycarbonate resins that may be blended with the branched polycarbonate in proportions not to affect the desired properties include aromatic polycarbonate resins. According to an embodiment, additions of linear polycarbonate are optionally present in amounts less than about 25 percent by weight of the total weight of the composition. According to an embodiment, at higher amounts of linear polycarbonate, from about 15 to about 20 percent by weight, the composition comprises about 40 to about 70 percent by weight branched polycarbonate. According to an embodiment, the polyester is present in an amount from about 10 to about 40 percent by weight.

The preferred aromatic carbonate for use in the practice in the present invention is a branched polymer derived from 2,2-bis(4-hydroxyphenyl)propane (bisphenol-A), and a branching agent which provides branches in the usually linear carbonate polymer commercially available under the trade designation LEXAN Registered™ from General Electric Company.

The polyesters prepared generally do not contain any tri-functional or greater monomeric branching agent.

Preferably a styrene-acrylic copolymer is utilized for additional enhanced chemical resistance. The polymer is based on oligomer with styrene and acrylate building blocks polymerized in solvent and which have desirable glycidyl groups incorporated as side chains. The polymerization is carried out in continuous stirred tank reactor. High number of epoxy groups per oligomer chain is desired, around 10, preferable greater than about 15, and more preferable greater than about 20. The epoxy containing polymer is preferable utilized in polycarbonate polyester blends in absence of a catalyst such as a sodium stearate type of catalyst. Apart from having excellent hydro stability, these blends surprisingly have excellent clarity, as measured by an excellent percent transmission. According to an embodiment, a metal catalyst, such as sodium stearate, is not used to facilitate any interaction with the styrene-acrylic copolymer. According to an embodiment, the epoxy containing polymeric material has a molecular weight greater than about 3000, preferable greater than about 4000, and more preferable greater than about 6,000. According to an embodiment, the epoxy containing material includes styrenic and acrylic groups. Various types of epoxy-based materials have been used in this current study, such as ECN 1299(an epoxy cresol novolac resin), Joncryl ADR 4368 (a styrene-acrylate copolymer with epoxy functionality), Joncryl ADR 4300, epoxydized soyabean oil etc. "Joncryl" polymers are available from Johnson Polymer Sturtevant, Wisconsin. The epoxy functionality can react with end groups to introduce chain extension in the system, as evident from MFR (Melt Flow Rate) decreases. These epoxy containing polymer blends can maintain the clarity of the blend above about 70% transmission.

Additionally, additives such as antioxidants, thermal stabilizers, mold release agents, antistatic agents, whitening agents, colorants, plasticizers, minerals such as talc, clay, mica, barite, wollastonite and other stabilizers including but not limited to UV stabilizers, such as benzotriazole, supplemental reinforcing fillers such as flaked or milled glass, and the like, flame retardants, pigments, additional resins or combinations thereof may be added to the compositions of the present invention. The different additives that can be incorporated in the compositions are commonly used and known to one skilled in the art. Illustrative descriptions of such additives may be found in R. Gachter and H. Muller, Plastics Additives Handbook, 4th edition, 1993.

Examples of thermal stabilizers include triphenyl phosphite, tris-(2,6-dimethylphenyl)phosphite, tris-(2,4-di-t-butyl-phenyl) phosphite, tris-(mixed mono-and di-nonylphenyl)phosphite, dimethylbenzene phosphonate and trimethyl phosphate. Examples of antioxidants include octadecyl-3-(3,5-di-tert-butyl-4-hydroxyphenyl)propionate, and pentaerythrityl-tetrakis[3-(3,5-di-tert-butyl-4-hydroxyphenyl)propionate]. Examples of light stabilizers include 2-(2-hydroxy-5-methylphenyl)benzotriazole, 2-(2-hydroxy-5-tert-octylphenyl)-benzotriazole and 2-hydroxy-4-n-octoxy benzophenone. Examples of plasticizers include dioctyl4,5-epoxy-hexahydrophthalate, tris-(octoxycarbonylethyl)isocyanurate, tristearin and epoxidized soybean oil. Examples of the antistatic agents include glycerol monostearate, sodium stearyl sulfonate, and sodium dodecylbenzene-sulfonate.

A preferred class of stabilizers including quenchers are those which provide a transparent/translucent and colorless product. Typically, such stabilizers are used at a level of 0.001-10 weight percent and preferably at a level of from 0.005-2 weight percent. The favored stabilizers include an effective amount of an acidic phosphate salt; an acid, alkyl, aryl or mixed phosphite having at least one acidic hydrogen; a Group IB or Group IIB metal phosphate salt; a phosphorus oxo acid, a metal acid pyrophosphate or a mixture thereof. The suitability of a particular compound for use as a stabilizer and the determination of how much is to be used as a stabilizer may be readily determined by preparing a mixture of the polyester resin component and the polycarbonate and determining the effect on melt viscosity, gas generation or color stability or the formation of interpolymer. The acidic phosphate salts include sodium dihydrogen phosphate, mono zinc phosphate, potassium hydrogen phosphate, calcium dihydrogen phosphate and the like. The phosphites may be of the formula V:

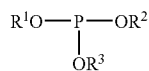

where R1, R2 and R3 are independently selected from the group consisting of hydrogen, alkyl and aryl with the proviso that at least one of R1, R2 and R3 is hydrogen.

The phosphate salts of a Group IB or Group IIB metal include zinc phosphate and the like. The phosphorus oxo acids include phosphorous acid, phosphoric acid, polyphosphoric acid or hypophosphorous acid.

The polyacid pyrophosphates may be of the formula VI:

wherein M is a metal, x is a number ranging from 1 to 12 and y is a number ranging from 1 to 12, n is a number from 2 to 10, z is a number from 1 to 5 and the sum of (xz)+y is equal to n+2. The preferred M is an alkaline or alkaline earth metal.

Furthermore diols and/or polyols, including 2-methyl-2,4-pentanediol and poly(propyleneglycol), may be added to the compositions of the present invention. These additives are known to be able to further decrease the yellowing of the polycarbonate and polyester blends upon gamma irradiation.

The most preferred quenchers are oxo acids of phosphorus or acidic organo phosphorus compounds. Inorganic acidic phosphorus compounds may also be used as quenchers, however they may result in haze or loss of clarity. Most preferred quenchers are phosphoric acid, phosphorous acid or their partial esters.

Examples of mold releasing agents include pentaerythritol tetrastearate, stearyl stearate, beeswax, montan wax, and paraffin wax. Examples of other resins include but are not limited to polypropylene, polystyrene, polymethyl methacrylate, and polyphenylene oxide. Combinations of any of the foregoing additives may be used. Such additives may be mixed at a suitable time during the mixing of the components for forming the composition.

The production of the compositions may utilize any of the blending operations known for the blending of thermoplastics, for example blending in a kneading machine such as a Banbury mixer or an extruder. The sequence of addition is not critical but all components should be thoroughly blended.

To prepare the resin composition, the components may be mixed by any known methods. Typically, there are two distinct mixing steps: a premixing step and a melt mixing step. In the premixing step, the dry ingredients are mixed together. The premixing step is typically performed using a tumbler mixer or ribbon blender. However, if desired, the premix may be manufactured using a high shear mixer such as a Henschel mixer or similar high intensity device. The premixing step is typically followed by a melt mixing step in which the premix is melted and mixed again as a melt. Alternatively, the premixing step may be omitted, and raw materials may be added directly into the feed section of a melt mixing device, preferably via multiple feeding systems. In the melt mixing step, the ingredients are typically melt kneaded in a single screw or twin screw extruder, a Banbury mixer, a two roll mill, or similar device. The examples are compounded using a twin screw type extruder, where the mean residence time of the material is from about 20 s to about 30 s, and where the temperature of the different extruder zones is from about 230° C. to about 290° C.

The glass transition temperature of a preferred blend is from about 75° C. to about 150° C., more preferably from about 80° C. to about 130° C.

The transparency, chemical resistance and processing behavior of these compositions make them suitable for use in a number of applications, particularly in house wares and appliances, as well as in blow molded containers, bottles, and the like, particularly those in contact with detergents, oily materials, and the like including general organic materials.

The composition may be shaped into a final article by various techniques known in the art such as injection molding, extrusion, gas assist blow molding, or vacuum forming.

EXAMPLES

Example A Enhanced chemical resistance is observed when branched Polycarbonate (Mw=37000)—PCTG blends are used. Commonly, linear Polycarbonate with molecular weight in the range of 18000-29000 is used in these blends. Chemical resistance can be increased by increasing the molecular weight of the polycarbonate used (e.g., Mw=36000). In the current invention however, the chemical resistance in certain cases (e.g., Commercial Detergents such as Hoover Upholstery Cleaner) is further enhanced by substituting linear polycarbonate with branched polycarbonate.

Example A tensile bars were treated by total immersion in Hoover Upholstery Cleaner for 7 days, at 70 C, 1% strain. The compositions of the tested bars are shown in Table 1, as well as the results showing the superior chemical resistance of the branched polycarbonate containing compositions over the linear polycarbonate containing compositions. Tensile bars were measured using procedure ASTM D638.

Example B shows that the enhancement in chemical resistance by using branched polycarbonate does not compromise injection molding processing. FIG. 1 below shows viscosity vs. shear rate curves. FIG. 1 shows that despite the higher initial viscosity of Example B1 branched polycarbonate-containing formulation, the viscosity at higher shear rates is similar to Example B2 linear polycarbonate containing formulation. Therefore chemical resistance is enhanced while maintaining a similar viscosity at higher shear rates typical of injection molding applications.

In addition to increased chemical resistance, branched polycarbonate-PCTG blends have demonstrated good processability in blow moldable applications. The "hang time" a measurement of melt strength is increased when branched polycarbonate is used to replace linear polycarbonate (Table 2).

The composition of the materials described above is shown in Table 3.

FIG. 1. Viscosity vs. shear rate curves taken at 248 C. The viscosity of Example B1 branched polycarbonate containing composition is higher than Example B2 linear polycarbonate containing composition at low shear rates making it superior for blow molding applications. At the same time Example B1 formulation shows flow improvement through shear rate thinning at shear rates typical of injection molding making it also amenable for this type of application. Composition of Example B specimens is described in Table 2.

TABLE 1

Chemical resistance evaluation through retention of tensile elongation at break after exposure of samples to Hoover Upholstery Carpet Cleaner. Exposure 7 days, 70 C., 1% Strain, total immersion. The polyester is PCTG (Terephthalate acid + 80 mole % CHDM + 20 mole % EG). Major specimen components are described. Tested compositions also contained 0.05% acid quencher, 0.15% mold release, 0.1% heat stabilizer and 0.25% styrene acrylic copolymer Joncryl ADR4368.

| | Weight % | | | | |
|---|---|---|---|---|---|
| Example | Branched PC | Linear PC | PCTG Polyester | % Retention | Comments |
| A1 | 84.45 | 0 | 15 | 0.0 | Major cracks |
| A2 | 74.45 | 0 | 25 | 2.4 | Some cracks |
| A3 | 64.45 | 0 | 35 | 2.6 | Minor cracks |
| A4 | 54.45 | 0 | 45 | 5.1 | No cracks |
| A5 | 0 | 84.45 | 15 | 0.0 | Broken bars |
| A6 | 0 | 74.45 | 25 | 0.0 | Broken bars |
| A7 | 0 | 64.45 | 35 | 0.0 | Major cracks |
| A8 | 0 | 54.45 | 45 | 3.9 | Minor cracks |

From the above data, a % Retention of tensile elongation at break with the inventive composition of at least about 2% is obtainable.

TABLE 2

Composition of Example B formulations.

| | Weight % | | | | | |
|---|---|---|---|---|---|---|
| Example | Branched PC | Linear PC | PCTG Polyester | Mold Release (PETS) | Joncryl ADR4368 | Quencher |
| B1 | 63.58 | 0 | 36 | 0.15 | 0.25 | 0.02 |
| B2 | 0 | 63.8 | 36 | 0 | 0.15 | 0.05 |

TABLE 3

Melt strength evaluation in a extrusion blow molding machine using hang time approach. Higher hang times indicate higher melt strength. Melt Temperature of 505 F. Tested compositions also contained 0.02% quencher, 0.15% mold release, and 0.25% styrene acrylic copolymer Joncryl ADR4368.

| | Weight % | | | |
|---|---|---|---|---|
| Example | Branched PC | Linear PC | PCTG Polyester | Hang Time (s) |
| C1 | 63.58 | 0 | 36 | 11 |
| C2 | 44.51 | 19.07 | 36 | 8.8 |
| C3 | 55.58 | 0 | 44 | 7.9 |
| C4 | 38.91 | 16.67 | 44 | 6.4 |

What is claimed is:

1. A composition comprising a thermoplastic resin blend suitable for blow molding comprising:
    (a) from about 50 to about 80 percent by weight, based on the total weight of the blend, of a branched polycarbonate, and
    (b) from about 20 to about 50 weight percent, based on the total weight, of a polyester resin derived from the condensation of a) a cyclohexanedimethanol or equivalent thereof alone or with an ethylene glycol or equivalent thereof, b) together with a terephthalic acid or equivalents thereof alone or with an isophthalic acid or equivalent thereof; and
    (c) a styrene-acrylic copolymer with multiple epoxy groups.

2. The composition of claim 1, wherein the polycarbonate and polyester are present in proportions to form a clear blend having a transmission of seventy percent or greater and a % retention of tensile elongation at break of 2% or more after exposure to at least one detergent or other oily material(s).

3. The composition of claim 1 wherein desirable enhanced chemical resistance is provided to the blend by the addition of above 0 to about 1.0 weight % of the styrene-acrylic copolymer with multiple epoxy groups.

4. The composition of claim 1, wherein the polycarbonate has a MFR (Melt Flow Rate; 300 C, 1.2 Kg, 6 min) of about 1.3 to about 2 g/10 min.

5. The composition of claim 3 wherein there is about 0.05 to about 1.0 weight % of the styrene-acrylic copolymer with multiple epoxy groups.

6. The composition of claim 1 comprising the optional presence of linear polycarbonate in an amount less than about 25 percent by weight of the total weight of the composition.

7. A shaped article molded from the blend of claim 1.

8. A shaped article molded from the blend of claim 4.

9. A container extrusion blow-molded from the blend of claim 1.

10. A container extrusion blow-molded from the blend of claim 4.

11. The composition of claim 1, wherein the composition contains the polycarbonate in an amount ranging from about 56 to 80 weight % and the polyester is present in an amount ranging from about 20 to 44 weight %.

12. A composition comprising a thermoplastic resin blend suitable for blow molding comprising:
    (a) from about 56 to about 80 percent by weight, based on the total weight of the blend, of a branched polycarbonate having an MFR (Melt Flow Rate; 300 C, 1.2 Kg, 6 min) of from about 1 to about 2 g/10 min;

(b) from about 20 to about 44 weight percent, based on the total weight of the blend, of a polyester resin derived from the condensation of a) a cyclohexanedimethanol or equivalent thereof alone or with an ethylene glycol or equivalent thereof, b) together with a terephthalic acid or equivalents thereof alone or with an isophthalic acid or equivalent thereof; and (c) above 0 about 1 wt % of a chemically enhancing amount of a styrene-acrylic copolymer having multiple epoxy groups, based on the total weight of the blend.

13. The composition of claim 12, wherein the polycarbonate and polyester are present in proportions to form a clear blend having a transmission of seventy percent or greater and a % retention of tensile elongation at break of 2% or more after exposure to at least one detergent or other oily material(s).

14. The composition of claim 12 wherein desirable enhanced chemical resistance is provided to the blend by the addition of above 0 to about 1.0 weight % of the styrene-acrylic copolymer with multiple epoxy groups.

15. The composition of claim 12, wherein the polycarbonate has a MFR (Melt Flow Rate; 300 C, 1.2 Kg, 6 min) of about 1.3 to about 2 g/10min.

16. The composition of claim 12 wherein there is about 0.05 to about 1.0 weight % of the styrene-acrylic copolymer with multiple epoxy groups.

17. The composition of claim 12 comprising the optional presence of linear polycarbonate in an amount less than about 25 percent by weight of the total weight of the composition.

18. A shaped article molded from the blend of claim 12.

19. A shaped article molded from the blend of claim 15.

20. A container extrusion blow-molded from the blend of claim 12.

21. A container extrusion blow-molded from the blend of claim 15.

* * * * *